(12) United States Patent
Elbert et al.

(10) Patent No.: US 11,524,239 B2
(45) Date of Patent: Dec. 13, 2022

(54) GAMEPLAY SYSTEM WITH PLAY AUGMENTED BY MERCHANDISE

(71) Applicant: Disney Enterprises, Inc., Burbank, CA (US)

(72) Inventors: Jeffrey Elbert, Los Angeles, CA (US); Przemyslaw Iwanowski, San Francisco, CA (US); Brent David Strong, Santa Clarita, CA (US); Matthew S. Daly, La Crescenta, CA (US); Sarit Ghildayal, Los Angeles, CA (US); Bob Hickman, Simi Valley, CA (US); John Cody Hampton, Orlando, FL (US); Alex Christopher Wilde, Orlando, FL (US); Amanda Marie Leahy, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/531,971

(22) Filed: Nov. 22, 2021

(65) Prior Publication Data
US 2022/0080321 A1    Mar. 17, 2022

Related U.S. Application Data

(63) Continuation of application No. 16/801,939, filed on Feb. 26, 2020, now Pat. No. 11,207,599.

(51) Int. Cl.
*A63F 13/65* (2014.01)
*G06K 9/00* (2022.01)
(Continued)

(52) U.S. Cl.
CPC ............ *A63F 13/65* (2014.09); *A63F 13/213* (2014.09); *A63F 13/216* (2014.09);
(Continued)

(58) Field of Classification Search
CPC ...... A63F 13/65; A63F 13/213; A63F 13/216; A63F 2300/1087; A63F 2300/69; A63F 2300/8082; G06K 9/00536; G06K 9/2054
See application file for complete search history.

(56) References Cited

U.S. PATENT DOCUMENTS 5,346,418 A * 9/1994 Arad ........................ A63H 5/04
                                                                446/485
5,766,077 A * 6/1998 Hongo ................... A63F 13/833
                                                                463/30

(Continued)

*Primary Examiner* — Omkar A Deodhar
*Assistant Examiner* — Shauna-Kay N. Hall
(74) *Attorney, Agent, or Firm* — Snell & Wilmer L.L.P.; Kent A. Lembke

(57) ABSTRACT

A gameplay system for providing interactivity based on a piece of merchandise or other object held or worn by a player. The system includes an object identification assembly, which may be a modified computer vision system, that operates to sense, for a gameplay participant, the presence and identity of a particular augmenting object such as themed merchandise worn or held by a rider of a theme park ride. The sensing may be performed by detecting an on-and-off pattern of light emitted from the object. In response, the gameplay system selects or modifies the interactive features of gameplay associated with the participant based on the identified augmenting object. For example, the interactive features are selected from memory by the gameplay system controller to match a character associated with the augmenting object during any interactive gameplay. This allows the gameplay participant to choose their abilities or powers for gameplay.

24 Claims, 5 Drawing Sheets

(51) Int. Cl.
*A63F 13/213* (2014.01)
*A63F 13/216* (2014.01)
*G06V 10/22* (2022.01)

(52) U.S. Cl.
CPC ......... *G06K 9/00536* (2013.01); *G06V 10/22* (2022.01); *A63F 2300/1087* (2013.01); *A63F 2300/69* (2013.01); *A63F 2300/8082* (2013.01)

(56) References Cited

U.S. PATENT DOCUMENTS

| | | | | |
|---|---|---|---|---|
| 8,089,458 | B2* | 1/2012 | Barney | A63F 13/245 |
| | | | | 345/158 |
| 10,486,078 | B1* | 11/2019 | Hampton | A63H 33/26 |
| 2005/0215170 | A1* | 9/2005 | Poesch | A63H 3/16 |
| | | | | 446/297 |
| 2017/0157522 | A1* | 6/2017 | Chen | A63H 33/26 |

\* cited by examiner

GAMEPLAY SYSTEM WITH PLAY AUGMENTED BY MERCHANDISE

CROSS REFERENCE TO RELATED APPLICATIONS

This application is a continuation of U.S. patent application Ser. No. 16/801,939, filed Feb. 26, 2020, which is incorporated herein by reference in its entirety.

BACKGROUND

1. Field of the Description

The present invention relates, in general, to augmented reality (AR), virtual reality (VR), and other gameplay systems and experiences configured for interactive gameplay for one or more players or participants, and, more particularly, to a gameplay system configured to provide augmented or modified gameplay or interactive experiences based upon detection or sensing of an augmenting object (e.g., a particular piece of merchandise that is worn, handheld, or otherwise made a part of gameplay by a player or participant).

2. Relevant Background

There are numerous situations where it is desirable to provide participants with unique interactive experiences. For example, theme and amusement parks and other large venues continue to strive to entertain visitors in a way that allows them to participate in the experience. This may involve providing interactivity such that they can modify or affect the produced experience. In particular applications, a ride or space may include gameplay that is interactive with the system being adapted to sense visitor input and to respond by changing audio outputs, visual displays, and the like.

To date, though, it has been difficult to provide interactive experiences on rides and other settings with a larger number of participants that are individualized so that each participant can immediately recognize that actions they have taken individually has changed gameplay or the experience. Instead, each participant may feel that their interactions are being lost in the noise of the group or crowd. In some cases, this issue is addressed by providing special effects such as imagery in an AR setting, for example, that seems to be produced or modified by each individual participant (e.g., each rider in a theme park vehicle). This is desirable to enhance the feeling that each participant is interacting and effecting the experience as they see the results of their interactions or user inputs. However, to date, all participants are treated similarly with their inputs being processed in a common manner, and it is now desirable to create interactive systems adapted to allow each participant to create an interactive experience that is more unique to them and, in some cases, that they can alter over time such as each time they ride a theme park ride.

SUMMARY

To address the above and other issues, the inventors designed a system for gameplay (or a gameplay system) that can be used to provide an interactive attraction or ride for use in theme or amusement parks and other environments. The new gameplay system is adapted to combine themed merchandise (sometimes labeled "an augmenting object") with an interactive experience such as a park attraction or ride.

Briefly, the gameplay system includes an object identification assembly, which may be a modified computer vision system, that operates to sense, for a gameplay participant, the presence and identity of a particular augmenting object (such as themed merchandise worn or held by a rider of a theme park ride). In response, the gameplay system selects or modifies the interactive features of gameplay associated with the participant based on the identified augmenting object. For example, the augmenting object may be themed merchandise (worn or held by a rider in a ride or attraction vehicle) that is associated with a character (such as a movie character), and the interactive features are selected from memory by the gameplay system controller to match this character during any interactive gameplay. This allows the gameplay participant to choose their abilities or powers for gameplay by choosing particular augmenting objects (e.g., themed merchandise) to wear or use/hold when riding on a theme park ride or attraction that includes the unique interactive gameplay system of the present description. In this manner, the gameplay system is operable to augment the gameplay or interactive experience by bringing in another layer of interactivity and repeatability (as it can repeatedly sense and identify the augmenting object) while also providing many new opportunities for designers of interactive experiences such as rides and attractions with gameplay.

More particularly, a system is provided that is adapted to provide individualized or participant-specific augmentation of interactive experiences. The system includes a display system operating to present to a participant, located in or proximate to a predefined space, an image within an interactive experience (e.g., a virtual 3D image or the like). The system also includes an augmenting object (e.g., merchandise or other physical component) held or worn by the participant while in the predefined space, and the augmenting object includes a signaling assembly generating an output signal. Further, the system includes an object identification assembly processing the output signal to detect the augmenting object in the predefined space and to determine a location of the augmenting object in the predefined space. During system operations, the image presented by the display system is generated after the detection of the augmenting object by the object identification assembly and based on the location of the augmenting object. In some embodiments, the processing of the output signal further includes determining an identification of the augmenting object. In such cases, the image is generated based on the identification of the augmenting object (e.g., to suit the powers or functionality of the worn or held merchandise).

In a preferred implementation, the object identification system includes a computer vision system capturing an image of the predefined space including the participant, the augmenting object, and the output signal. Then, it may be useful for the output signal to take the form of output light emitted or transmitted from the augmenting object. In this regard, the output light may include a pattern of light flashes at an output frequency, and the object identification system may include an object identification module comparing the pattern of light flashes to a plurality of predefined signaling patterns to identify a matching one of the predefined signaling patterns. Further, the signaling assembly may include one or more light sources operating to emit the pattern of light, and the one or more light sources may each be an infrared (IR) light emitting diode (LED). In the same or other cases, the one or more light sources may be at least three LEDs mounted on a wearable base portion or shell portion of the augmenting object to be spaced apart a predefined distance from a neighboring one of the at least three LEDs.

During system operations, the object identification module may process the captured image to create a segment of the captured image that includes a portion of a body of the participant associated with the augmenting object and then process the segment to detect the pattern of light flashes. It may be also be useful to have the captured image include video of the space gathered over a time period defined to provide oversampling in detecting the pattern of light flashes, and the object identification module implements a sampling frequency of at least 30 Hz (such as in the range of 30 to 90 Hz with 60 Hz used in one exemplary implementation). Further, it may be useful for the output signal to include a header defining a start point of a signal followed by a message body defining an identifier for the augmenting object, and the object identification assembly can then be configured to process the identifier in an output signal to determine a type of merchandise associated with the augmenting object and the display system may render or otherwise generate the augmentation or image in a manner that is suited to or linked to the type of merchandise (e.g., to suit a power gauntlet for a particular character.

In other embodiments, it may be useful to provide an interactive game system in which players can modify gameplay by selecting which (if any) add-on elements they attach to their toy (e.g., to a toy robot or the like). In these embodiments, the system includes a base toy (with "toy" meaning nearly any object that may be used in gameplay and which often will include computing capabilities and mechanisms for locomotion). The base toy may include memory storing a set of base operating functions. The base toy may also have a body, a set of operational elements mounted upon the body, and a controller operating the set of operational elements to operate to provide one or more of the set of base operating functions. The system further includes an add-on element detachably mounted upon the body. The add-on element includes memory storing a set of upgrade operating functions, and, during use of the system for interactive gameplay, the controller operates the set of operational elements to operate to provide one or more of the set of upgrade operating functions.

In some implementations of this system, the add-on element comprises a thematic component configured for mounting to an external surface of the body of the base toy, and the thematic component includes the memory adapted for being communicatively linked to the controller of the base toy. The set of operational elements includes a motion assembly for moving the body of the base toy, the set of base operating functions includes a speed range for the moving of the body or a set of locomotion types for the body, and the set of upgrade operating functions modifies the speed range or modifies or adds to the set of locomotion types. In these or other cases, the set of operational elements includes a sound assembly and a light assembly, the set of base operating functions includes a set of sounds for output by the sound assembly and a set of lighting parameters for use in operating the light assembly, and the set of upgrade operating functions modifies or adds to at least one of the set of sounds and the set of lighting parameters. Further, in these or other embodiments, the set of base operating functions include attacking modes, defensive modes, and life parameters for use in interactive gameplay and the set of upgrade operating functions modifies or adds to at least one of the attacking modes, the defensive modes, and the life parameters.

DETAILED DESCRIPTION

Figure 1:
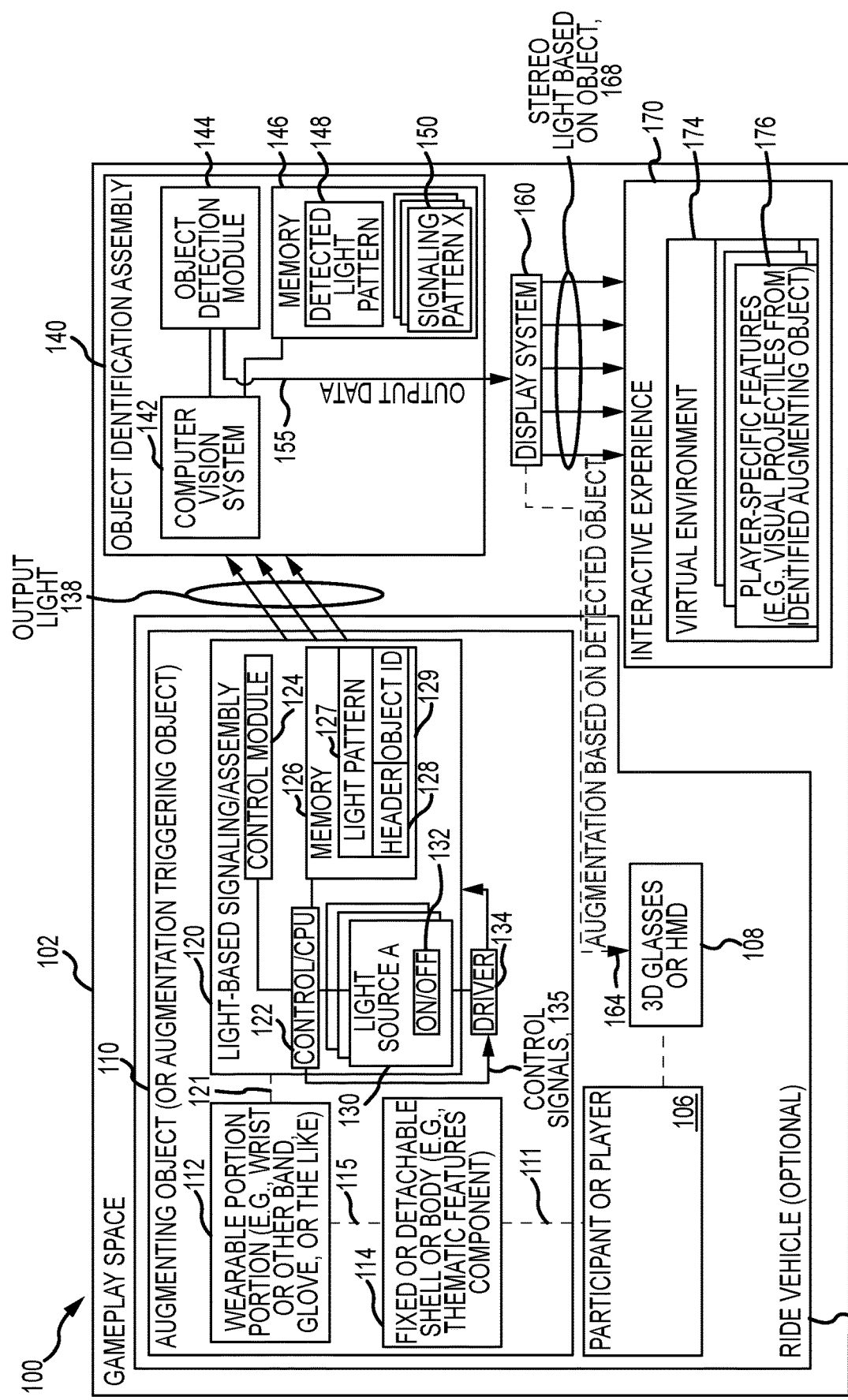
FIG. 1 is a functional block drawing of a gameplay system (or other interactive system) to provide personalized interaction for participants based on use and detection of an augmentation triggering object (e.g., particular merchandise or a toy linked to the game) of the present description.

Embodiments described herein are directed toward a gameplay (or other interactive) system configured to provide enhanced individualized interactivity for each player or participant. The gameplay system includes a plurality of augmenting objects, such as pieces of themed merchandise, and each has associated with it an identifier and a set of interactive features or functionalities. The gameplay system includes an object identification (or detection) assembly configured to sense the presence of one (or more) of the augmenting objects in a gameplay space and to determine the identity (or identifier) of the sensed augmenting object. In response, a game controller generates or modifies interactive features of the gameplay provided to a participant associated with the sensed augmenting object to create a unique interactive experience for the participant.

In one particular implementation, the new gameplay system may be implemented at an amusement or theme park in one of its rides or attractions designed for interactivity (e.g., with vehicle riders). The regular gameplay experience is augmented or enhanced/modified by allowing participants such as vehicle riders to wear (or hold) augmenting objects or themed merchandise, which may be purchased onsite or offsite (e.g., online or a physical offsite store). One particular use case recognizes that characters such as superheroes often wear objects in the form of "power gauntlets" that can be activated to provide superhero-type abilities (e.g., shoot out weapons), and these power gauntlets may include a wristband or glove with a themed outer covering or body to be worn on the participants wrist or hand (and often extend over the wrist).

In practice, participants that may be vehicle riders may be provided new interactive features or functions. For example, the participants wearing a power gauntlet may experience new visual types of projectiles rendered from the perspective of their wrist (or other portion of the body where object is worn), e.g., projectiles rendered as if projected from the worn augmenting object. In some cases, the participants will also see that their projectiles, which were provided based on an identification of the power gauntlet they are wearing/holding, have a unique impact on the virtual projected environment or AR portion of the interactive experience that differs from other impacts associated with projectiles or other augmenting features/functionalities associated with other power gauntlets and with interactions provided to those not wearing or holding any augmenting object. Stated differently, certain "powers" are given to those with the power gauntlets by the gameplay system and will provide unique opportunities to affect the nearby physical or displayed scenic environment such as by unlocking different events as part of an interactive game. In other cases, though, the gameplay system may extend outside a venue setting and allow the user of the augmenting object to role play at home, on a cruise ship, or other environment and, in some cases, to connect with other experiences like console and/or online games.

FIG. 1 is a functional block drawing of a gameplay system (which can mean nearly any interactive system) 100 to provide personalized interaction for participants 106 based on use and detection of an augmentation triggering object (e.g., particular merchandise or a toy linked to the game) 110 of the present description. The system 100 includes a gameplay or interactive space 102, which in the example of a park ride or attraction may be a space along a vehicle's ride path or a space in which visitors of the park enter to participate in gameplay. As shown, a human participant or player 106 has entered the space 102, and, in a typical system 100, there would be one, two, three, or more participants 106.

The participant or player 106 may enter the space 102 on foot or may be brought into the space 102 in or on a ride vehicle 104. The participant 106 may be wearing equipment to support a 3D virtual or augmented reality (VR or AR) display system 160 providing signals 164 such as by wearing 3D glasses or an HMD 108. The signals 164 are used to provide an individualized interactive experience to the participant 106 by augmenting their interactive experience 170 in a manner based on whether or not they are wearing or holding an augmenting object 110 and based on an identification of the object 110 (e.g., what piece of merchandise is it and what "powers" or functions are associated with it for the particular interactive experience 170 provided in the gameplay space 102 by the system 100). In other cases, though, the participant 106 may not wear any 3D headgear 108 and be provided the interactive experience including 3D visuals unique to them and their augmenting object 110 by having the display system 160 adapted for autostereoscopic projection or display via its output light 168 providing left and right eye images for the participant 106 at their present eye locations. The type of display system 160 used may vary to implement the gameplay system 100 as long as it is configured to provide audio and/or visual components that are linked to identification of the augmenting object 110 and associating it with the participant 106 so that the participant 106 perceives the interactive experience as being affected by their wearing or holding the augmenting object 110.

In the system 100, the participant 106 is shown with dashed line 111 to be wearing or holding an augmenting object (or augmentation-triggering object) 110. This object 110 may take a wide variety of forms including, but not limited to, toys or clothing articles or nearly any pieces of merchandise that a participant 106 may hold or wear such as on their hands, wrists, arms, heads, or other portions of their bodies (e.g., gloves or bands for fitting over a portion of a person's hands, an item that can be held on a person's arms with a wrist or arm band, a hat, a shirt, coat, uniform, vest, or the like). As shown, the object 110 includes a base portion 112 that typically will be wearable such as a wrist, arm, or hand band configured to retain the object 110 on the body of the participant 106, and the object 110 further may include a shell or body 114 that may be fixed onto the base 112 or be detachable (both attachment types shown by dashed line 115). The shell or body 114 may take nearly any form with some embodiments using it to provide thematic features to the object 110 such as to take on the appearance of articles of clothing, tools, or weapons associated with characters from media (e.g., a superhero movie character, a character from a children's animated feature, and so on). In some of the specific examples provided herein, the augmenting object 110, with its wearable portion 112 and shell/body 114, is designed to take on the appearance of a power gauntlet, but, with this example in mind, those skilled in the arts will readily understand that the object 110 may be nearly any item that the public associates with characters from their favorite media or characters often associated with gameplay (e.g., from role play and so on).

The system 100 includes an object identification assembly 140 that is adapted to detect the presence of the augmenting object 110 in the space 102 (and associate it with participant 106) and to identify the detected object 110 (e.g., which type of power gauntlet is the participant 106 wearing from a set of two or more differing types?). The assembly 140 may be wholly or partially located onboard the vehicle 104 in some embodiments. The assembly 140 is also preferably adapted to determine where on the participant's body the object 110 is worn or otherwise located such as on which wrist or hand as this will allow the display system 160 to create visual augmentations or features 176 to the interactive experience 170 that are more realistic as they appear to emanate from or to be projected from that portion of the body or the location of the object 110 in the gameplay space 102. This may also be useful if the participant 106 is wearing or holding more than one object 110 such as one on each of their wrists, hands, or arms (and each may be different to provide two (or more) differing or matching augmentations or interactive features 176 per player 106 during operations of the system 100). The detection method implemented by the assembly 140 preferably is automatic and will not require the participant 106 to take any action (possibly other than powering on their object 110) such as a special registration or tagging to hardware of the system 100. Object detection is, in this way, more interesting and magical.

To this end, the augmenting object 110 further is shown to include a light-based signaling assembly 120 that is mounted upon or in the wearable or base portion 112 as shown with dashed line 121. Other implementations, though, provide the assembly 120 on or in the shell or body 114. The assembly 120 is adapted to generate or emit output light 138 in a manner that acts to provide a signal to the object identification assembly 140, which it can process to detect and identify the augmenting object 110 in the space 102. The assembly 120 includes a controller or processor 122 that manages operations of a control module 124 and memory (or data storage) 126. The memory 120 stores a light pattern or signal definition 127, which may take the form of a header 128 and an object identification 129. In some embodiments, the output light 138 may be a series of flashes of light timed with the sampling frequency of the assembly 140 to communicate the bits of the header 128 and the bits of the object ID 129, and the header 128 may be used to identify the presence of one of the augmenting objects 110 (e.g., to indicate presence of a power gauntlet) while the object ID 129 indicates the particular type of object 110 (e.g., to indicate a particular piece of merchandise such as a specific power gauntlet).

The control module 124 may take the form of software and/or firmware to provide the control functions described herein. The module 124 may include wireless communication devices to allow the assembly 120 to communicate with the object identification assembly 140 such as to receive a command or ping to initiate operations to provide the output light 138 (e.g., the object 110 may not provide the light signal or output 138 until interrogated by the assembly 140 in some cases). The light-based signaling assembly 120 includes one or more light sources 130 and a driver (e.g., a self-contained power supply or the like) 134, and each of the sources 130 may respond to control signals 135 from the controller 122 to provide the output light 138 in the defined light pattern 127 (i.e., to signal a header 128 and an ID 129) by alternating between on and off states 132.

In one embodiment, the light sources 130 are each light emitting diodes (LEDs) that in some cases are infrared (IR) LEDs so that the output light 138 is not visible to the participant 106 so as to make the detection and identification by the object identification assembly 140 more magical or behind-the-scenes for the participant 106. The use of two, three, or more light sources 130 operating based on the same light pattern 127 is desirable in some cases to increase the likelihood that the output light 138 is detected by the assembly 140 (e.g., is not blocked by portions of the player's body, by the vehicle 104, by other participants 106, and the like), and, typically, two or more sources 130 are used that are spaced apart some distance from each other on the base 112. The shell or body 114 is configured to allow the light 138 from sources 130 to pass such as with windows transparent or transmissive to the light 138 or by being formed of a material that allows the light 138 to be transmitted through the shell or body 114.

As shown, the object identification assembly 140 includes a computer vision system 142 that runs an object detection module 144 (e.g., software providing algorithms and/or machine learning processes). The assembly 140 further includes memory/data storage 146 storing a detected light pattern 148 from the output light 138 from the object 110 and a set of one-to-many signaling patterns 150. The object detection module 144 works to compare detected light patterns 148 with the signaling patterns 150 to identify likely matches. Each signaling pattern 150 is associated with a particular augmenting object type (e.g., a particular piece of merchandise such as a power gauntlet for a character from a movie). The computer vision system 142 may take any form now understood in the arts or to be later developed, and it basically operates to capture video images of the space 102 including the participant 106 and any augmenting object 110 present.

In some embodiments, the computer vision system 142 operates to process these images to identify the presence and location of the participant 106 and then operates with the object detection module 144 to monitor for the presence of the output light 138. The output light 138 is then processed to find a match among the patterns 150. The module 144 or another element of the assembly 140 communicates this match or output data 155 to the display system 160. The output data 155 may include a location of the object 110 within the space 102 (e.g., within the vehicle 104) and on or near the body of the participant 106. The output data 155 also will identify the augmenting object 110 to the display system 160. The display system 160 uses this information to generate (e.g., render) player-specific features 176 in the virtual environment 174 provided as part of the interactive experience 170 in the space 102. For example, the display system 160 may render 3D imagery (signals 164 or light 168) that produces visual projectiles 176 that appear to emanate or to be projected from the augmenting object 110, and the projectiles 176 may be rendered to suit or match the type or ID of the augmenting object 110 and may differ for each type or ID of object 110 (e.g., to suit the abilities or powers of the character associated with the augmenting object such as the superhero associated with a power gauntlet or the like).

Figure 2:
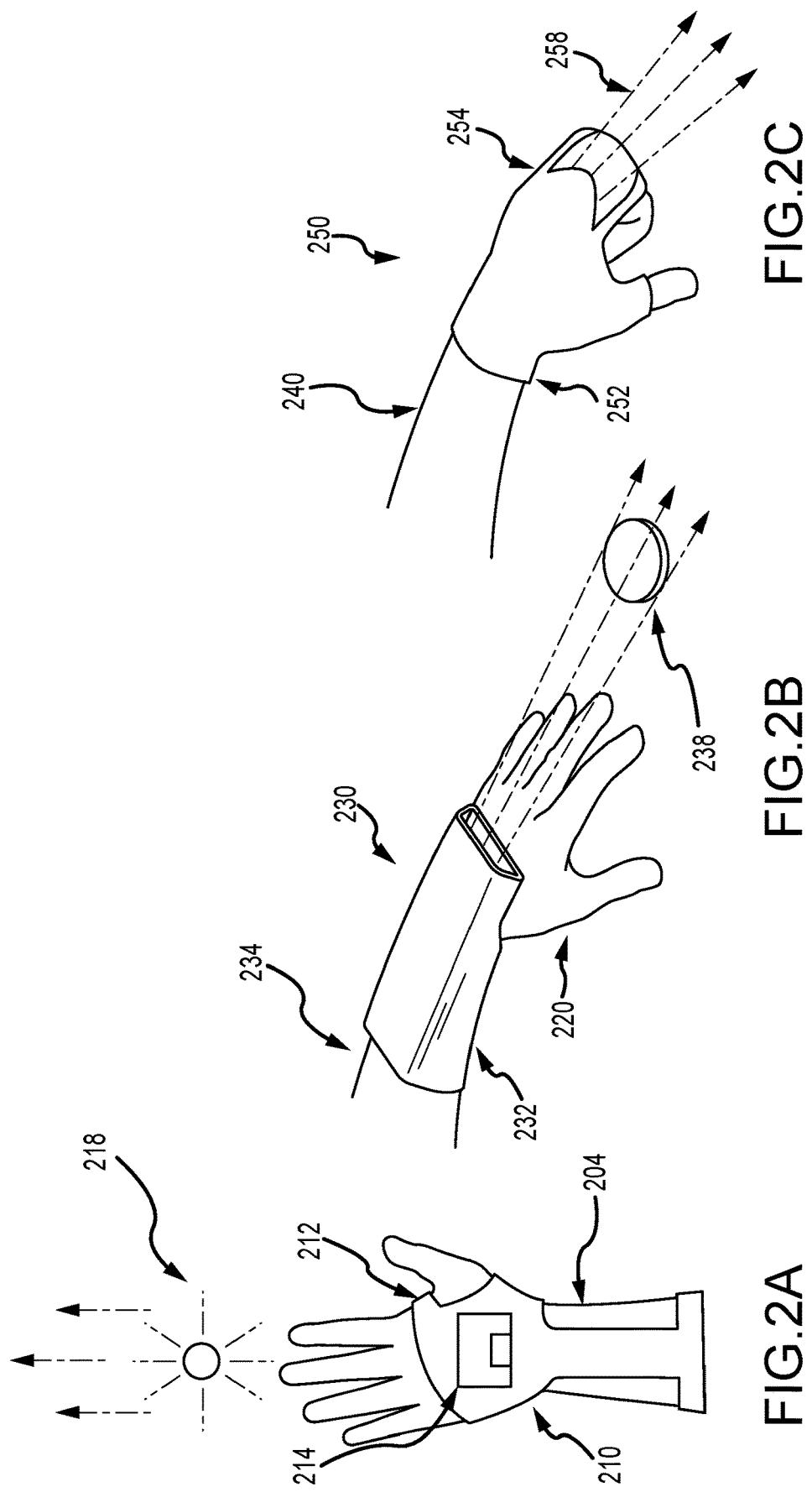
FIGS. 2A-2C illustrate a top view and top perspective views, respectfully, of a participant wearing an augmenting object (as would be useful in the system of FIG. 1) in the form of three differently themed power gauntlet and showing their use after identification to differently augment an interactive gameplay environment.

FIGS. 2A-2C illustrate a top view and top perspective views, respectfully, of a participant wearing an augmenting object (as would be useful in the system 100 of FIG. 1 as augmenting object 110) in the form of three differently themed power gauntlets 210, 230, and 240 and showing their use after identification to differently augment an interactive gameplay environment. As shown in FIG. 2A, a player 204 is using power gauntlet 210, and they are wearing the power gauntlet 210 on their left hand (with portions extending over their left wrist). The gauntlet 210 includes a base portion 212 that is wearable as it includes an elastic (or Velcro-type) band 212 that extends around the body of the hand of the user 204 between the forefinger and thumb, and the base portion 212 retains the gauntlet 210 upon the player's hand. The power gauntlet 210 also includes a shell or body 214 that may be detachable from the base 212 or be more rigidly attached, and the shell or body 214 provides thematic features or elements such that the gauntlet 210 takes a form matching a gauntlet worn by a character (e.g., on or from some form of media such as a superhero from a movie, a villain or hero from a computer or video game, and the like).

A light-based signaling assembly such as assembly 120 would be provided on or in the gauntlet 210 such as on the base portion 212 and is hidden from the view of the player 204 by the shell or body 214 (and, hence, is not shown in FIG. 2A). During use in gameplay as shown in FIG. 2A, an object identification assembly (such as assembly 140) operates to monitor a gameplay space for the presence of the gauntlet 210 (and gauntlets 230 and 240) using a computer vision system (such as system 142 of FIG. 1). When detected and identified (e.g., gauntlet "X" associated with character "Y"), the object identification assembly provides this information or data to a display system to augment or modify an interactive experience in a manner matched to the particular power gauntlet 210. As shown, the augmentation is specific to the gauntlet 210 and includes rendering and displaying a stream of fireballs (or similar projectiles) 218 to the player 204 as part of an interactive experience. The augmentation is player-specific in that the visual features 218 are shown to the player 204 with the gauntlet 210 (or the left hand or wrist of the player 204) as being the source of the projectiles/visual features 218, and the direction of the stream of virtual projectiles 218 may be set by the display system based on output data from the computer vision system including the orientation and/or pose of the wrist and/or hand of the player 204 in the gameplay space.

As shown in FIG. 2B, a second or different player 220 is wearing a second power gauntlet 230 that differs from the first gauntlet 210. The second gauntlet 230 includes a base or base portion 232 in the form of a wrist band so it can be worn by the player 220 on their wrist (here shown to be the player's left wrist). A shell or body 234 is attached (in a fixed or detachable manner) to the base portion 232 and is used to provide a different set of thematic features to the gauntlet 230 when compared to the gauntlet 210 and also to disguise and hide from view a light-based signaling assembly (which may be on the base portion 232 (or on an interior surface or portion of the body or shell 234).

During use, the light-based signaling assembly may be turned on by the player 220 (or turn on automatically in response to signals from an object identification assembly) and operate to generate a signal specific to the gauntlet (or type of gauntlet) that allows the object identification assembly to detect presence of a gauntlet (gauntlets 210, 230, and 240 may provide a signal with a similar or standard header in some embodiments) and also to determine its ID or type. When detected, the object identification assembly passes the location of the gauntlet 230 (or the hand/wrist of the player 220) to a display system to generate a visual (and, in some cases, audio) augmentation to an interactive experience that is matched or linked to the type or ID of the gauntlet 230, and it is shown here in FIG. 2B to differ from the gauntlet 210 such as disks or other solid-type projectiles 238.

FIG. 2C shows a third example of a power gauntlet 250 that is being worn by a player/user 240. The gauntlet 250 includes a base portion or base 252 in the form of an article of clothing that extends over and wraps around the wrist and provides a partial or full glove over the player's hand. A shell or body 254 is supported upon the base 252 to provide it thematic features differing from gauntlets 210 and 230 and, as discussed above, to hide the presence of a light-based signaling assembly. During use, an object identification assembly detects the presence of a gauntlet in a gameplay area, and it identifies the ID and/or type for the gauntlet 250. This information along with the location of the object 250 and/or hand/wrist of the player 240 is passed to a display system, which renders an augmentation suited to the ID and/or type of the gauntlet 250, and this augmentation 258 (e.g., energy rays or lasers or another projectile differing from those provided for gauntlets 210 and 230) is displayed (or played if audio) to the viewer 240 in the gameplay space as if being emitted from the power gauntlet 250 (or the player's hand and/or wrist).

Figure 3:
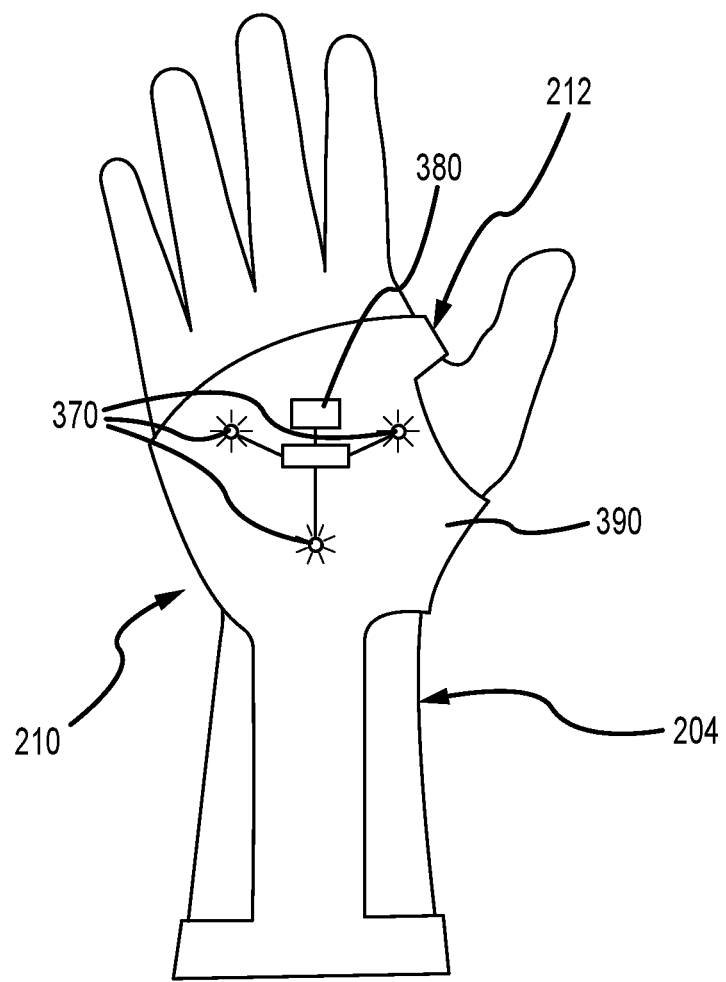
FIG. 3 illustrates the augmenting object (e.g., power gauntlet or similar piece of merchandise) with a detachable body or shell removed to show portions of a light-based signaling assembly operable to facilitate detection and identification of the augmenting object.

FIG. 3 illustrates the augmenting object (e.g., power gauntlet or similar piece of merchandise) 210 of FIG. 2A with the body or shell 214 removed to show portions of a light-based signaling assembly (e.g., an implementation of the assembly 120 of FIG. 1) operating to facilitate detection and identification of the augmenting object 210. In this embodiment, the light-based signaling assembly includes three IR LEDs 370 that are spaced apart from each other in a triangular pattern so that they emit light (shown to be "ON" in FIG. 3) outward from the top of the hand of the player 210 (when worn as shown in FIGS. 2A and 3). A different pattern may be used in some cases such as a straight line, and other embodiments may use fewer or more light sources with three being a useful number to enhance the likelihood that at least one of them will be detected by a computer vision system processing images of a player wearing the gauntlet 210. The light-based signaling system is shown to also include a controller 380 for generating operating or control signals to "play" a signal pattern assigned to the gauntlet 210 (continuously or in response to an interrogation or ping from the object identification assembly). Additionally, one (or more) LED drivers 390 are provided to provide appropriate power concurrently to the LEDs 370 (for concurrent ON/OFF operations based on the assigned light or signal pattern).

Figure 4:
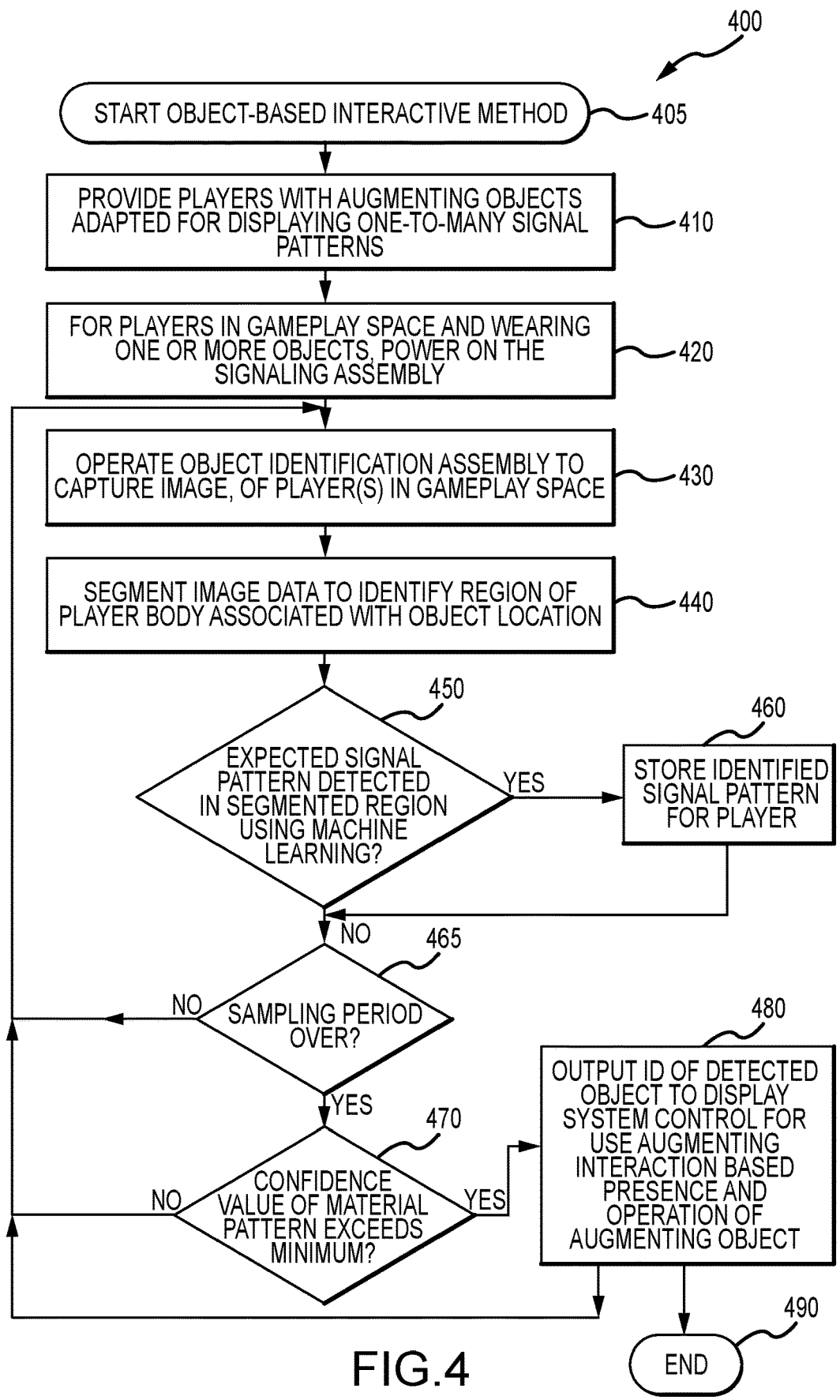
FIG. 4 is a flow diagram of a method for providing object-based augmentation of an interactive experience including algorithms for object detection using computer vision and machine learning.

FIG. 4 is a flow diagram of a method 400 for providing object-based augmentation of an interactive experience including algorithms for object detection using computer vision and machine learning, and the method 400 may be carried out by operations of the system 100 and using the power gauntlets 210, 230, and 240 of FIGS. 2A-2C. The method 400 starts at 405 such as with defining a signal or lighting pattern to be assigned to each augmenting object (e.g., to each piece of merchandise or toy or other object) to be used in a particular gameplay or other interactive experience and with choosing an augmentation for the interactive experience to assign to that object when it is identified as being present and/or being used by a player. Each of the augmentations may then be provided in a gameplay controller or display system to allow it to be provided upon detection of the matching object.

The lighting patterns may vary to practice the method 400, but it may be useful to describe one useful prototype that was designed and used to show that detection of power gauntlets can be successfully performed. The patterns were encoded in 28 bits with a standard 8-bit header used to determine where the pattern begins and a unique 20-bit code to specify an object's unique identifier. The number of bits in the pattern and the sampling detection frequency define the maximum number of codes/patterns read per second by an object identification assembly or other detection device. In one embodiment, the sampling detection frequency was set at 60 frames/second (or 60 Hz) as it allows more differing patterns (e.g., more unique objects) but other embodiments may use a lower frequency. These variables may be varied to implement the method 400 to allow for either more patterns by using a higher frequency or for a lower sampling frequency by using fewer bits in the assigned codes/patterns.

The method 400 continues at 410 with providing participants or players with augmenting objects each adapted for displaying one of the assigned signals/codes with their light-based signaling assemblies. For example, there may be ten differing objects (or ten different types of objects each associated with a particular character or set of abilities/functionalities or "powers") that will be used for one interactive experience, and ten differing codes/signal patterns will be created and assigned to each object of the differing types. Step 410 may involve each of the players purchasing their own augmenting objects (e.g., each may be merchandise available at a theme park or other interactive gaming venue or available at other stores (online or brick and mortar)) or the objects may be provided free for use to each player (e.g., at the start of a ride or other interactive experience). In either example, the players may be informed that they may wish to choose merchandise due to its abilities to provide or alter their gameplay abilities in particular interactive experiences (e.g., if you want the powers of superhero "X" consider obtaining merchandise "Z"). At step 420, the players may wear or hold their augmenting objects and place them in a powered-on mode (or this may be performed automatically in response to external control signals in some cases).

At step 430, the method 400 continues with operating the object identification assembly to capture images of players in the gameplay space near where an interactive experience is being provided. In one example, this involves a computer vision system operating within a ride vehicle to capture images of the vehicle's riders when the vehicle has entered or stopped at or in a portion of the ride path involving an interactive experience. The method 400 continues at 440 with segmenting the image data to identify a region or portion of the player's body associated with an expected location of an augmenting object. For example, the object may be designed for wearing on a player's right or left wrist or hand, and step 440 may involve generating a set of skeletal data for a player and then segmenting the player's two wrists (e.g., draw a box or boundary around the portion of the image including the two player's wrists). Machine learning or other processes may be used on this segment to identify whether or not an augmenting object is present as this significantly reduces processing by reducing the number of pixels to be processed or searched for a matching pattern (which increases performance by reducing the time to process) and reduces the number of possible false positives (which allows the machine learning to ignore spurious flashes or other noise elsewhere in the image for improved accuracy).

In step 450, the method 400 involves the object detection module processing the segment of the image to determine whether or not there are any gauntlet present by looking for one or more light sources (e.g., IR LEDs) flashing a signal. If so, the module or its logic compares the sampled signal to see if it has an appropriate header and then whether it has a code or object ID matching one assigned to an augmenting object (e.g., a particular power gauntlet). If not, the method 400 continues at 465 with checking to see if the sampling period is over. If not, the method 400 continues at step 430. To enhance accuracy, oversampling can be used by detecting patterns of light in the image data over multiple seconds (e.g., using a longer sampling period at 465).

If a match is obtained in step 450, the method 400 continues at 460 with storing the identified signal pattern for a particular player. If at 465 if the sampling period is over, the method 400 continues at 470 with determining whether the confidence value of the matched pattern(s) exceeds a minimum value. If not, the method 400 continues at 430. If yes, then the method 400 continues at 480. Step 470 may involve taking the modal value and comparing it with its outliers. The difference in occurrence count between them can be used to determine the confidence value of the matched pattern from step 450.

In step 480, the method 400 may involve outputting the ID of the detected augmenting object (e.g., the power gauntlet or the like) to a display system control. This control may use this ID to augment interaction with the player based on the presence and operation of the augmenting object (e.g., to output the correct identifying code or lighting signal). This augmentation may take nearly any useful form such as audio and/or visual modifications to standard interactivity visual effects (or even replacement of such conventional effects). This may include providing visual outputs such as projectiles or image streams from the determined object and its location into a gameplay space. The projectiles or image streams (or other augmentations to the interaction) are chosen and/or rendered by the display system to suit or match the particular augmenting object that was identified in the method 400 (as discussed above with reference to FIGS. 2A-2C, for example). The method 400 may continues at 430 or may end at 490.

In some embodiments, anti-counterfeiting is provided in the method 400 by including a step in which an offboard device pings the gameplay space and any augmenting objects present to cause them to initiate or start flashing their identifying light-based signal. The ping signal may be specific to a particular object type so that the object identification assembly is only monitoring for particular objects in certain time periods. In this way, counterfeit objects are identified if they are transmitting their ID signals or codes during incorrect time periods.

The above embodiments are useful for explaining how an interactive gameplay experience (or other interactive experience) may be provided by a gameplay system of the present description to allow a user to choose how their experience is augmented by selecting which toy or piece of merchandise they bring with them into the interactive space (e.g., a theme park ride path, an AR or VR gameplay space, a home gaming system space, or the like). In other cases, though, it is desirable for a player or participant to be able to choose and/or modify operations of their toy or merchandise such as to have functions linked to or associated with a thematic element. Prior to this invention, toys and merchandise have been designed and manufactured to be single purpose with standalone functionality. Even "interactive" toys tend to allow the user to activate certain statically defined functions that are built into that toy. Hence, the inventors recognized a need for another gameplay system that includes merchandise or toys that can be dynamically extended in functionality by adding physical and functional customizations (which may take the form of thematic add-ons) to enhance interactivity and to provide the player/participant control over their gameplay.

Figure 5:
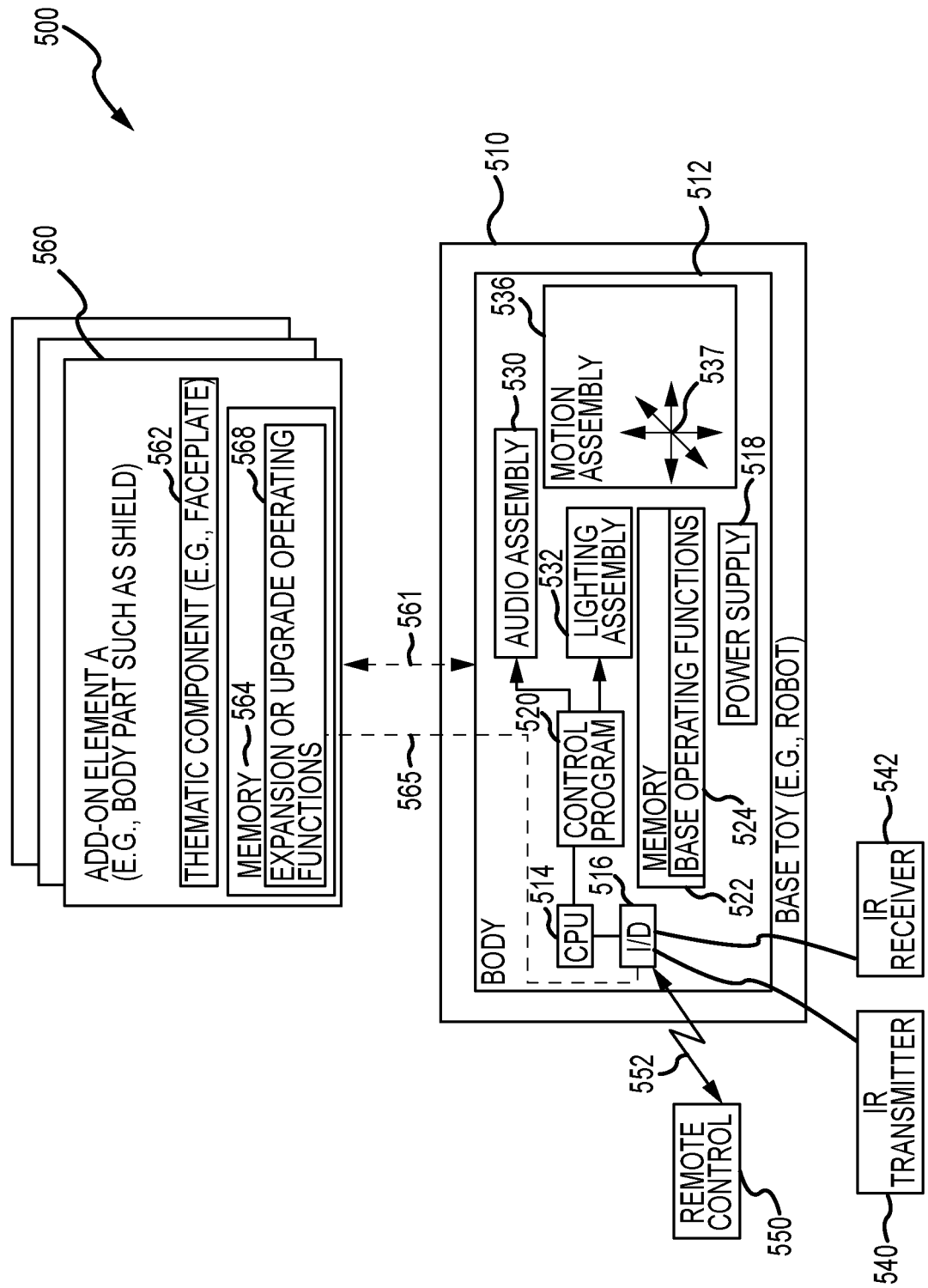
FIG. 5 is a functional block diagram of an additional gameplay system adapted to facilitate participant-selected functionality of an interactive object (e.g., toy such as a robot or "bot").

To this end, FIG. 5 illustrates a functional block diagram of an interactive gameplay system 500 adapted to allow a player (e.g., a buyer of merchandise) to select and/or modify (or upgrade) the thematic look of their toy and also its functionality during interactive gameplay (i.e., toy operations alone or with other toys). The system 500 includes a base toy 510 that may take many forms to implement the system 500 with a robot or "bot" being one (with "robot" intended to mean nearly any object with intelligence or logic to control and modify its operations and often with some form of locomotion that can also be modified or upgraded based on add-ons).

The base toy or merchandise 510 includes a physical body 512 for supporting its components. On the body 512, the base toy 510 includes a processor 514 managing operations of input/output (I/O) devices 516 and memory 522 as well as running or executing code or software to provide the logic capabilities of a control program 520. The I/O devices 516 may include transceivers for communicating, as shown with arrows 552, with a remote control 550 operable by a player/participant to modify operations of the toy 510 and/or to receive updates on the operating status of the base toy 510 (e.g., remaining lives, score during gameplay, weapon availability, weapon power levels, and so on), which may be displayed on a display or GUI (not shown) on remote control 550. The I/O devices 516 may also include components to facilitate interactive play in a more hidden or magical manner (e.g., without visibility to player operating remote control 550) such as IR transmitter 540 and IR receiver 542 that may be used for "firing" upon other toys in interactive play and for detecting "hits" on itself during such gameplay.

The memory 522 is used to store a set of base operating functions 524 that may define operations or operating ranges for the components on the body 512 until an add-on element 560 is received (as discussed below). The control program 520 is configured to generate control signals, such as in response to inputs 552 from the remote control 550, to an audio output assembly 530 providing sounds (stored in functions 524) via one or more speakers, a light assembly 532 outputting light with colors, brightness, pulsing/timing patterns, and the like set in operating functions 524, and a motion assembly 536 adapted to provide movement in one or more directions as shown by arrows 537 again that may be defined (e.g., with ranges) in base operating functions 524.

Significantly, the system 500 further includes a plurality of add-on elements 560 that can be mounted onto or inserted into the body 512 of the base toy 510 as shown with dashed line 561. The mounting or inserting 561 is shown to be reversible, e.g., the add-on element 560 is detachable, so as to allow a player or owner of the system 500 to swap out the add-on elements 560 to achieve differing modifications and/or upgrades to the base operating functions 524. This may be useful to change the thematic features of the toy 510 and to obtain functions associated with such themes (e.g., powers or functions associated with a particular character or species from movies, animated features, or other media or real-world environments).

As shown, each add-on element 560 is configured for the attachment 561 and may include a shell, cover, and/or faceplate 562 with (or without) thematic features. In such cases, the thematic component 562 may attach to an external surface of the body 512 such that it is visible during operations of the toy 512. In other cases, the component 562 may simply take the form of or include a plug-in element (e.g., a USB device) that plugs into an I/O device 516 on the body 512 to facilitate communications or data transfer shown with dashed line 565. Alternatively, the thematic component 562 such as a shell and/or faceplate may include such a communication device upon one of its interior/hidden surfaces.

Each add-on element 560 also includes memory or data storage 564 that is used to store a set of data 568 defining a set of expansion and/or upgrade operating functions 568 that are often unique or particular to which add-on element 560 is chosen from the two or more available in the system 500 (add-on thematic merchandise available for purchase for use with base toy 510). These functions may modify base operating functions 524 such as to increase a speed, direction, or other operating range of the motion assembly 536 or may provide new operating functions for one or more toy component such as to provide new sounds for output with audio assembly 530 or differing lighting colors or patterns for lighting assembly 532 or new motions 537 for motion assembly 536.

With this general understanding of FIG. 5 in hand, it may now be useful to provide one particular exemplary implementation of the interactive game system with base toy modifications/expansions. The exemplary implementation calls for the toy to take the form of a spider bot or spider-like robot. The add-on elements include multiple character-themed pieces of armor (e.g., faceplates) that go over a shell or other portion of the body of the base toy. Each includes memory/data storage defining a skill set (or operating functions for the base toy), and these may include lights and sound projection (e.g., to replicate laser or another weapon firing). In this implementation, the remote control has a display showing a life bar or life meter that drops during gameplay to reflect time of play and/or "hits" from opposing spider bots. The life meter allows the player to see "life" and/or assess "damage" from an attack. The display also shows a counter for use of the onboard weapons (e.g., a blaster counter).

The motion assembly is configured to provide movement of eight legs, which are geared and configured for spider-like movements. The input from the remote control can be used to control operations of the motion assembly to move the body forwards and backwards, to spin 360 degrees, to crouch down and stand up again. The base functionalities may include a set number of lives, and two battle modes using interactive IR technology that sends a one-way signal to "attack." In this regard, an IR sender/transmitter may be provided in the front of the spider bot's body and an IR receiver in the back of the body. One base operating mode may be a heavy power attack (e.g., ultimate weapon mode with corresponding light and sound effects). Another base or expansion functionality may be projection of a shield to block for a predefined length of time an attack (such as laser shots provided by IR transmissions from another bot), and a recount time may be provided for when the shield may next be used. When lives are depleted, the bot may be controlled to have its motion assembly move it into a crouch and, in some cases, to eject a body part (e.g., a detachable shell that is configured to receive the add-on elements). Play can be reset with, as needed, reattachment of the ejected body part.

The add-on element may be configured to provide thematic and/or tactical upgrades for the spider bot. Upgrades change the performance and attributes of gameplay and may include additional functionalities or changes in ranges or parameters for: speed, lights, sounds, projection design, attack and shield powers, interactions between set characters and/or other bots, and the like. In some cases, the add-on elements may provide new operating functions that define the thematic or personality features of the bot and may be considered "a personality chip" as they provide the look and/or feel of the bot such as by changing the eye or skin color.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, system 100 was shown to include a display system 160 for providing an augmenting image 168 viewable by a participant 106 of an interactive experience 170. However, other implementations of the system 100 may implement the display system 160 as an interactive system producing interactive or special effects that may or may not require a display screen and/or 3D devices to be experienced or enjoyed by the participant or player 106. For example, the interactive effects may be augmented imagery and/or may be or include practical effects, audio effects, or other effects, and each or some of these may be selected or modified based on a determined identification of the augmenting object worn or held by the participant or player 106.

We claim:

1. A system for providing player-selected interactive functionalities, comprising:
a base toy comprising memory storing a set of base operating functions, a body, a set of operational elements mounted upon the body, and a controller operating the set of operational elements to operate to provide one or more of the set of base operating functions; and
an add-on element detachably mounted upon the body, wherein the add-on element comprises memory storing a set of upgrade operating functions,
wherein the controller further operates the set of operational elements to operate to provide one or more of the set of upgrade operating functions,
wherein the add-on element comprises a thematic component configured for mounting to an external surface of the body of the base toy such that the thematic component is visible after assembly and during operations to perform the set of base operating functions, and
wherein the thematic component includes the memory adapted for being communicatively linked to the controller of the base toy.

2. The system of claim 1, wherein the set of operational elements includes a motion assembly for moving the body of the base toy and wherein the set of base operating functions includes a speed range for the moving of the body.

3. The system of claim 1, wherein the set of base operating functions includes a set of locomotion types for the body and wherein the set of upgrade operating functions modifies or adds to the set of locomotion types.

4. The system of claim 1, wherein the set of operational elements includes a sound assembly, wherein the set of base operating functions includes a set of sounds for output by the sound assembly, and wherein the set of upgrade operating functions modifies or adds to the set of sounds.

5. The system of claim 1, wherein the set of operational elements includes a light assembly, wherein the set of base operating functions includes a set of lighting parameters for use in operating the light assembly, and wherein the set of upgrade operating functions modifies or adds to the set of lighting parameters.

6. The system of claim 1, wherein the set of base operating functions includes attacking modes and defensive modes for use in interactive gameplay and wherein the set of upgrade operating functions modifies or adds to at least one of the attacking modes and the defensive modes.

7. The system of claim 1, wherein the set of base operating functions includes life parameters for use in interactive gameplay for use in interactive gameplay and wherein the set of upgrade operating functions modifies or adds to the life parameters.

8. The system of claim 1, wherein the thematic feature is shell, a cover, or a faceplate configured to extend over the external surface of the body.

9. The system of claim 1, wherein the set of upgrade operating functions includes at least one operating function missing from the set of base operating functions, whereby the at least one operating function is an additional operating function.

10. A system for providing player-selected interactive functionalities, comprising:
   a base toy comprising memory storing a set of base operating functions, a body, a set of operational elements mounted upon the body, and a controller operating the set of operational elements to operate to provide one or more of the set of base operating functions; and
   an add-on element detachably mounted upon the body,
   wherein the add-on element comprises memory storing a set of upgrade operating functions,
   wherein the controller further operates the set of operational elements to operate to provide one or more of the set of upgrade operating functions,
   wherein the set of operational elements includes a motion assembly for moving the body of the base toy in one or more directions a distance across a supporting surface,
   wherein the set of base operating functions includes a speed range for the moving of the body the distance across the supporting surface, and
   wherein the set of upgrade operating functions modifies the speed range.

11. The system of claim 10, wherein the add-on element comprises a thematic component configured for mounting to an external surface of the body of the base toy and wherein the thematic component includes the memory adapted for being communicatively linked to the controller of the base toy.

12. The system of claim 10, wherein the set of operational elements includes a sound assembly, wherein the set of base operating functions includes a set of sounds for output by the sound assembly, and wherein the set of upgrade operating functions modifies or adds to the set of sounds.

13. The system of claim 10, wherein the set of operational elements includes a light assembly, wherein the set of base operating functions includes a set of lighting parameters for use in operating the light assembly, and wherein the set of upgrade operating functions modifies or adds to the set of lighting parameters.

14. The system of claim 10, wherein the set of base operating functions includes attacking modes and defensive modes for use in interactive gameplay and wherein the set of upgrade operating functions modifies or adds to at least one of the attacking modes and the defensive modes.

15. The system of claim 10, wherein the set of base operating functions includes life parameters for use in interactive gameplay for use in interactive gameplay and wherein the set of upgrade operating functions modifies or adds to the life parameters.

16. The system of claim 10, wherein the set of base operating functions includes a set of locomotion types for the body and wherein the set of upgrade operating functions modifies or adds to the set of locomotion types.

17. The system of claim 10, wherein the set of upgrade operating functions adds an additional operating function to the set of base operating functions to increase an overall number of operating functions that can be performed by the set of operational elements.

18. A system for providing player-selected interactive functionalities, comprising:
   a base toy comprising memory storing a set of base operating functions, a body, a set of operational elements mounted upon the body, and a controller operating the set of operational elements to operate to provide one or more of the set of base operating functions; and
   an add-on element detachably mounted upon the body,
   wherein the add-on element comprises memory storing a set of upgrade operating functions,
   wherein the controller further operates the set of operational elements to operate to provide one or more of the set of upgrade operating functions,
   wherein the set of operational elements includes a sound assembly and a light assembly,
   wherein the set of base operating functions includes a set of sounds for output by the sound assembly and a set of lighting parameters for use in operating the light assembly,
   wherein the set of upgrade operating functions modifies or adds to at least one of the set of sounds and the set of lighting parameters,
   wherein the set of base operating functions includes life parameters for use in interactive gameplay for use in interactive gameplay, and
   wherein the set of upgrade operating functions modifies or adds to the life parameters.

19. The system of claim 18, wherein the add-on element comprises a thematic component configured for mounting to an external surface of the body of the base toy and wherein the thematic component includes the memory adapted for being communicatively linked to the controller of the base toy.

20. The system of claim 19, wherein the set of operational elements includes a motion assembly for moving the body of the base toy and wherein the set of base operating functions includes a speed range for the moving of the body.

21. The system of claim 18, wherein the set of base operating functions includes a set of locomotion types for the body and wherein the set of upgrade operating functions modifies or adds to the set of locomotion types.

22. The system of claim 18, wherein the set of base operating functions includes attacking modes and wherein the set of upgrade operating functions modifies or adds to the attacking modes.

23. The system of claim 18, wherein the set of base operating functions includes defensive modes for use in interactive gameplay and wherein the set of upgrade operating functions modifies or adds the defensive modes.

24. The system of claim 18, wherein the set of upgrade operating functions includes at least one operating function differing from each of the set of base operating functions.

* * * * *